US012174556B2

(12) United States Patent
Lim

(10) Patent No.: US 12,174,556 B2
(45) Date of Patent: Dec. 24, 2024

(54) TONER REFILL CONTROL OF IMAGE FORMING APPARATUS

(71) Applicant: Hewlett-Packard Development Company, L.P., Spring, TX (US)

(72) Inventor: Mok Hwa Lim, Seongnam-Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 14 days.

(21) Appl. No.: 18/076,384

(22) Filed: Dec. 6, 2022

(65) Prior Publication Data

US 2023/0120746 A1 Apr. 20, 2023

Related U.S. Application Data

(63) Continuation of application No. 17/058,271, filed as application No. PCT/KR2018/011673 on Oct. 2, 2018, now Pat. No. 11,561,486.

(30) Foreign Application Priority Data

Jul. 4, 2018 (KR) ........................ 10-2018-0077703

(51) Int. Cl.
*G03G 15/08* (2006.01)

(52) U.S. Cl.
CPC ..... *G03G 15/0863* (2013.01); *G03G 15/0894* (2013.01)

(58) Field of Classification Search
CPC ........... G03G 15/0863; G03G 15/0894; G03G 15/5079; G03G 15/0865; G03G 15/55; G03G 21/181; G03G 2215/00987; G03G 2215/0697; G03G 21/1878
See application file for complete search history.

(56) References Cited

U.S. PATENT DOCUMENTS

| | | | | |
|---|---|---|---|---|
| 6,859,634 | B2 | 2/2005 | Itoh et al. | |
| 7,177,551 | B2 * | 2/2007 | Eom | G03G 15/556 399/24 |
| 7,249,108 | B1 | 7/2007 | Walmsley et al. | |
| 9,436,122 | B2 | 9/2016 | Ignatchenko et al. | |
| 2005/0141901 | A1 | 6/2005 | Lee | |
| 2006/0051106 | A1 | 3/2006 | Takahashi et al. | |
| 2006/0140647 | A1 * | 6/2006 | Adkins | G03G 15/0865 399/12 |
| 2008/0181630 | A1 | 7/2008 | Matsumoto et al. | |
| 2009/0034995 | A1 * | 2/2009 | Mochizuki | G03G 21/1889 399/27 |

(Continued)

FOREIGN PATENT DOCUMENTS

| | | | |
|---|---|---|---|
| JP | 2005-041085 | A | 2/2005 |
| KR | 10-0636188 | B1 | 10/2006 |
| KR | 10-2014-0080781 | A | 7/2014 |

*Primary Examiner* — Jessica L Eley
(74) *Attorney, Agent, or Firm* — Foley & Lardner LLP

(57) ABSTRACT

An image forming apparatus and method for determining whether a toner refill apparatus is available are provided. The image forming apparatus includes a print engine to carry out a print job using a toner from a toner cartridge, a communication apparatus to communicate with a memory chip attached to a toner refill apparatus for refilling a toner in the toner cartridge, and a processor to identify whether the toner refill apparatus is available based on information stored in the memory chip of the toner refill apparatus.

18 Claims, 7 Drawing Sheets

(56) References Cited

U.S. PATENT DOCUMENTS

| | | | | |
|---|---|---|---|---|
| 2009/0219559 | A1 | 9/2009 | Lee et al. | |
| 2012/0288287 | A1 | 11/2012 | Wayman et al. | |
| 2014/0133883 | A1* | 5/2014 | Martin | G03G 15/0894 399/109 |
| 2014/0270814 | A1 | 9/2014 | Ignatchenko et al. | |
| 2016/0131992 | A1* | 5/2016 | Ignatchenko | B41J 2/17506 399/12 |
| 2016/0173284 | A1* | 6/2016 | Jeran | G03G 21/1892 713/180 |
| 2017/0126925 | A1 | 5/2017 | Sasaki | |
| 2018/0032017 | A1* | 2/2018 | Sakaguchi | G03G 15/5079 |

* cited by examiner

[Fig. 1]
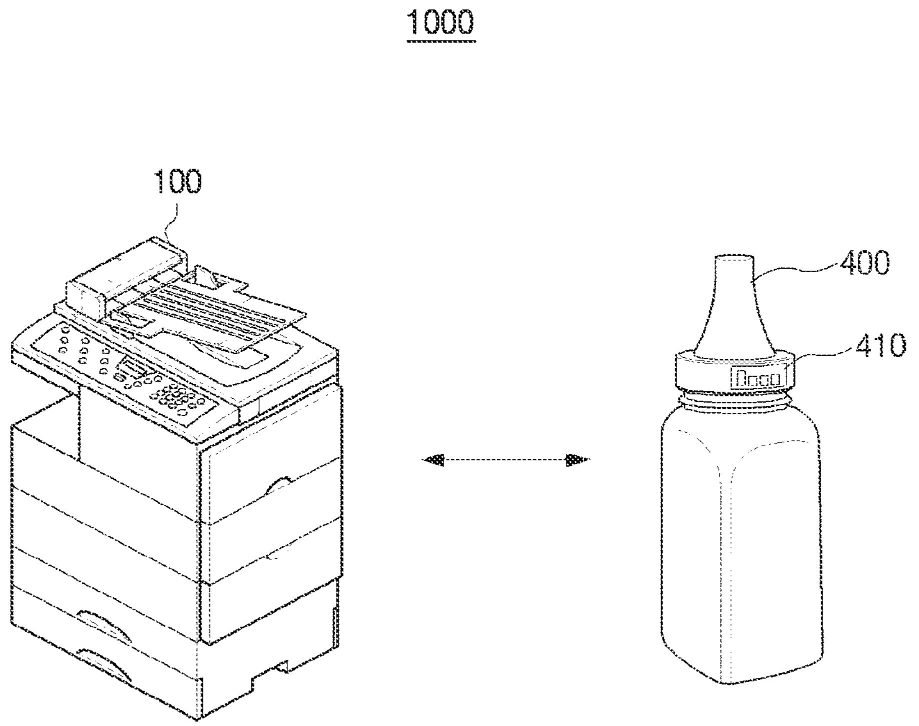
[Fig. 2]
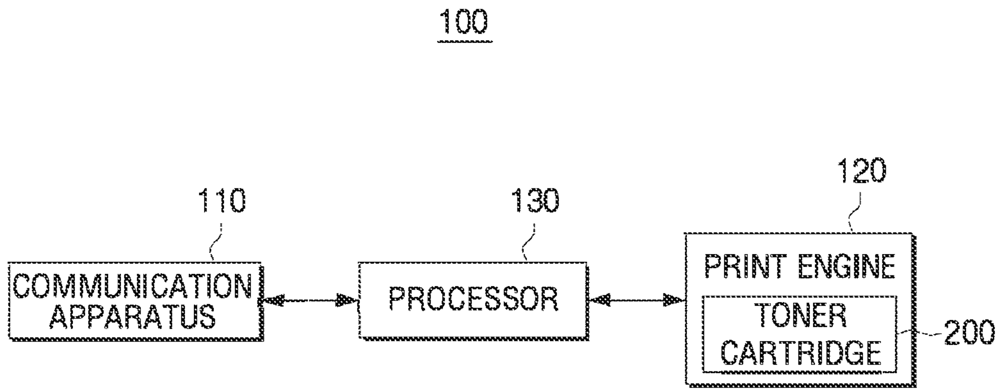

[Fig. 3]
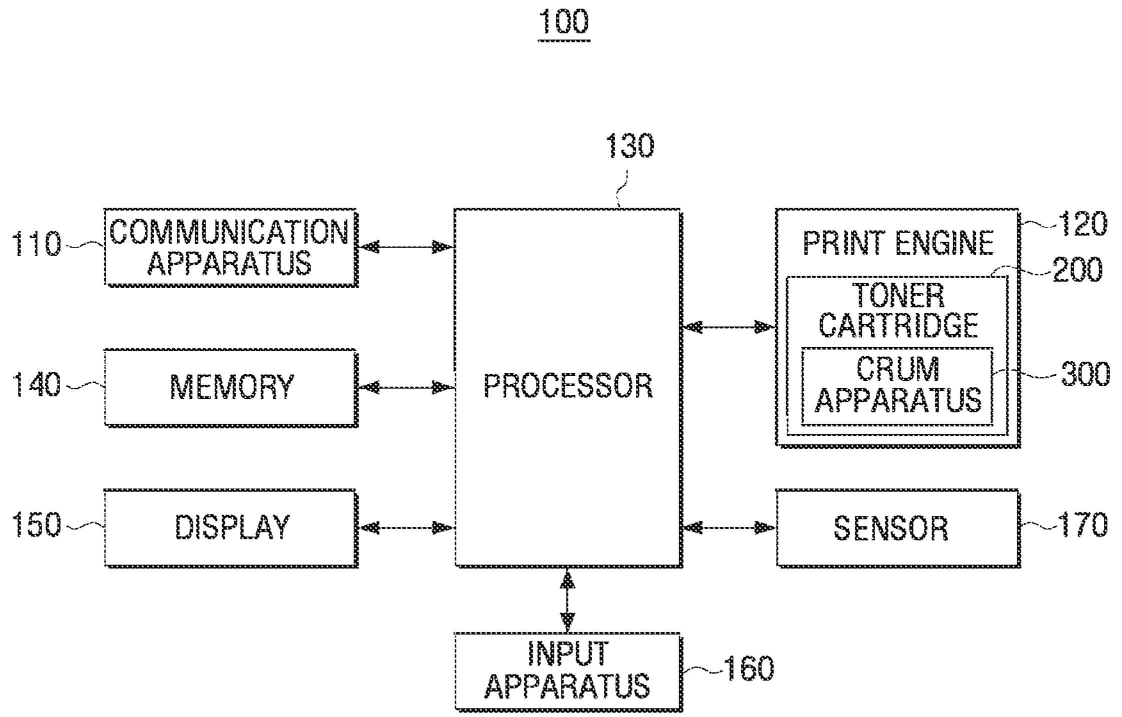
[Fig. 4]
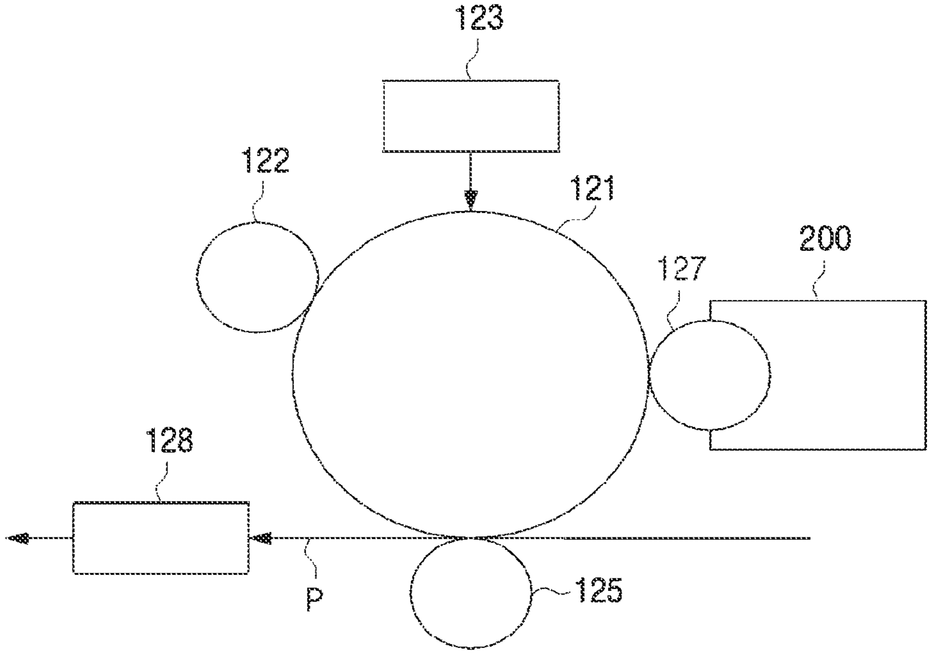

[Fig. 5]
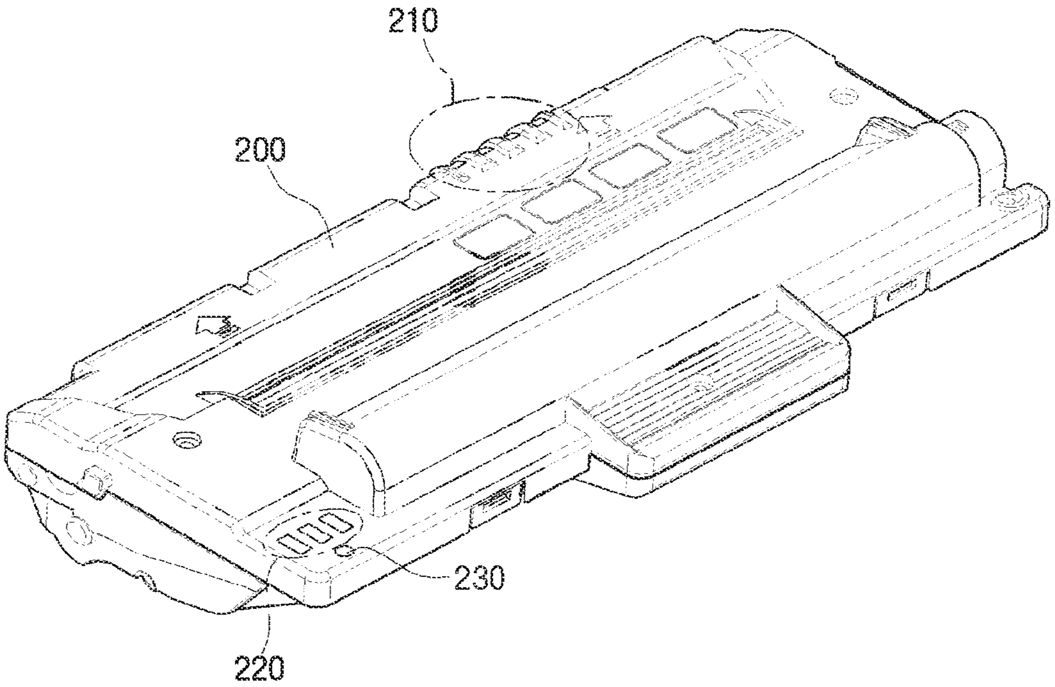
[Fig. 6]
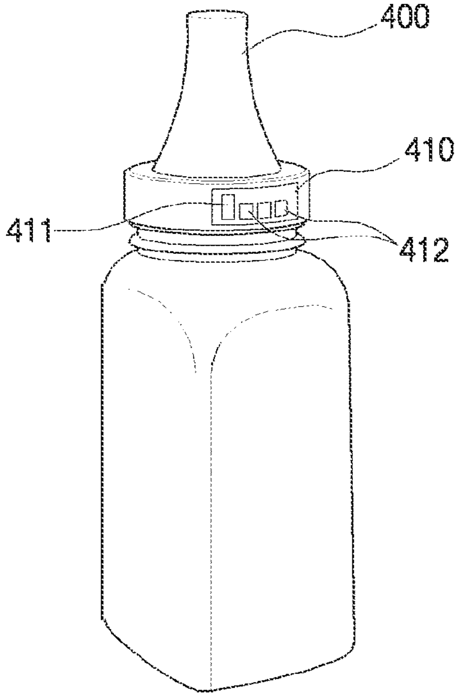

[Fig. 7]
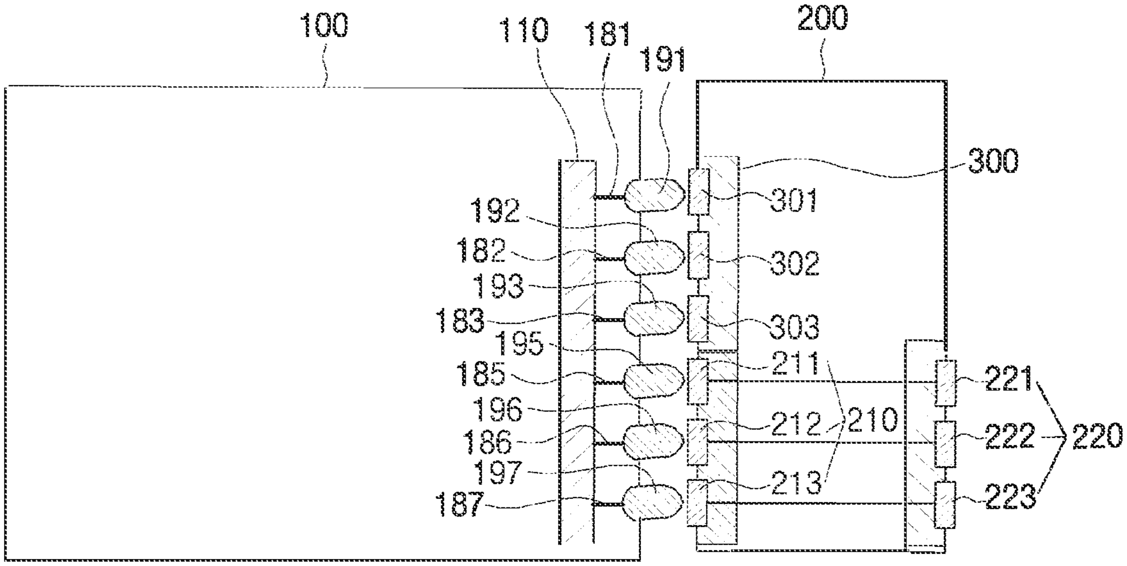
[Fig. 8]
| Refill Bottle Storage | | |
|---|---|---|
| ID | Item | Value |
| 1 | First Install Date & Time | YYYYMMDDHH_HHMMSS |
| 2 | Start Bit | 0 or 1 |
| 3 | Complete Bit | 0 or 1 |
| 4 | Refill Bottle Serial No | Serial No characters(Read Only) |
| 5 | Toner Cartridge Serial No | Serial No characters |
[Fig. 9]
| Toner Cartridge Storage | | |
|---|---|---|
| ID | Item | Value |
| 1 | Refill Bottle Serial No | Serial No characters |
| 2 | Complete Bit | 0 or 1 |

[Fig. 10]
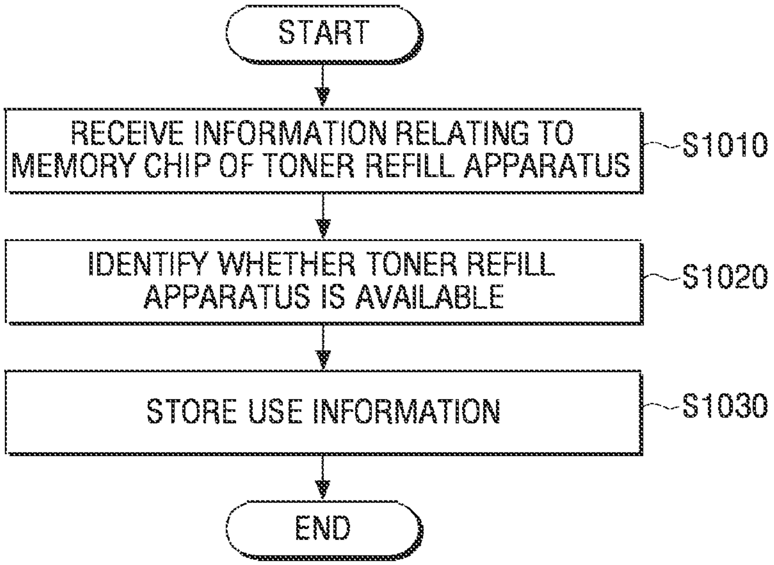

[Fig. 11]
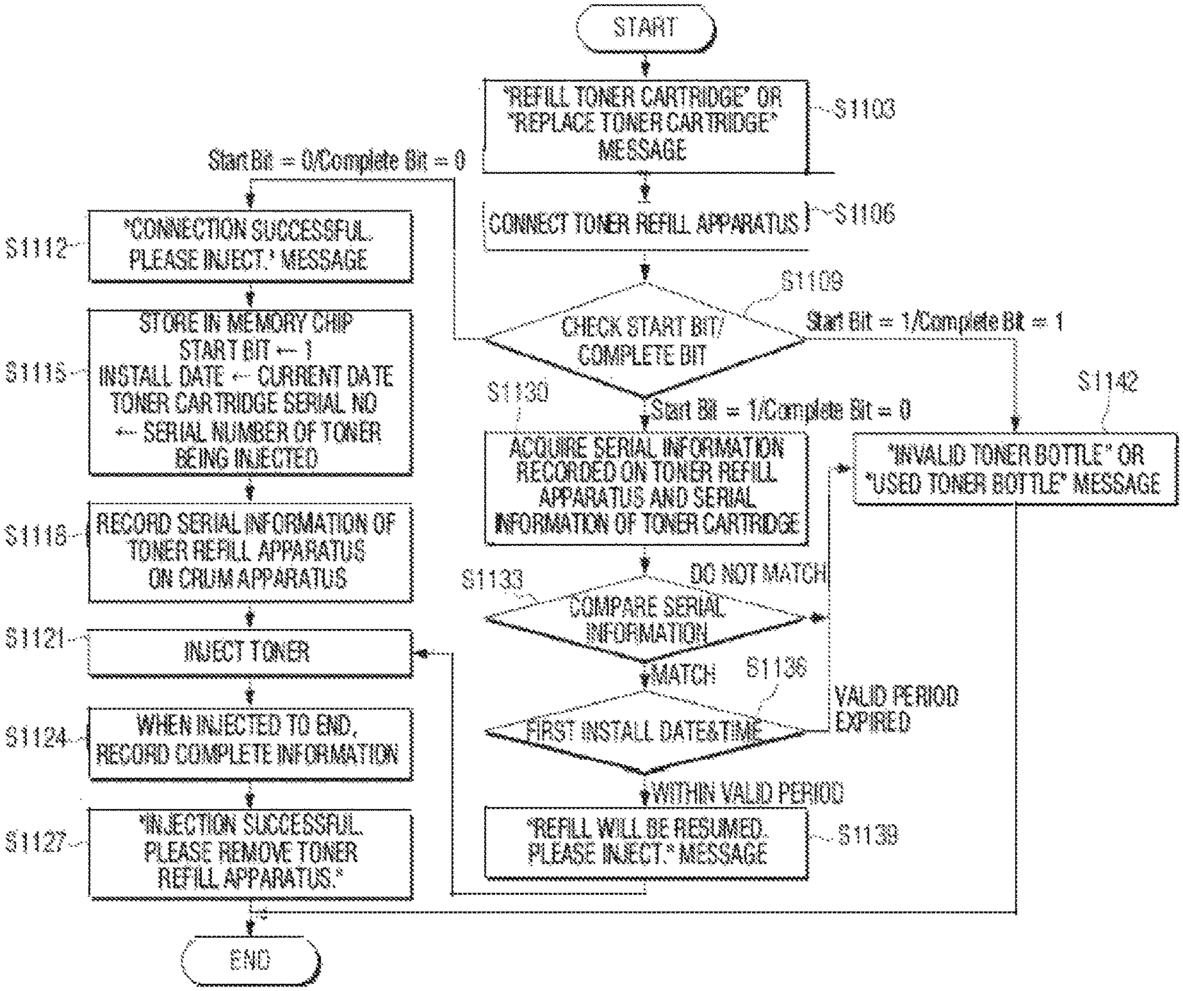

[Fig. 12]
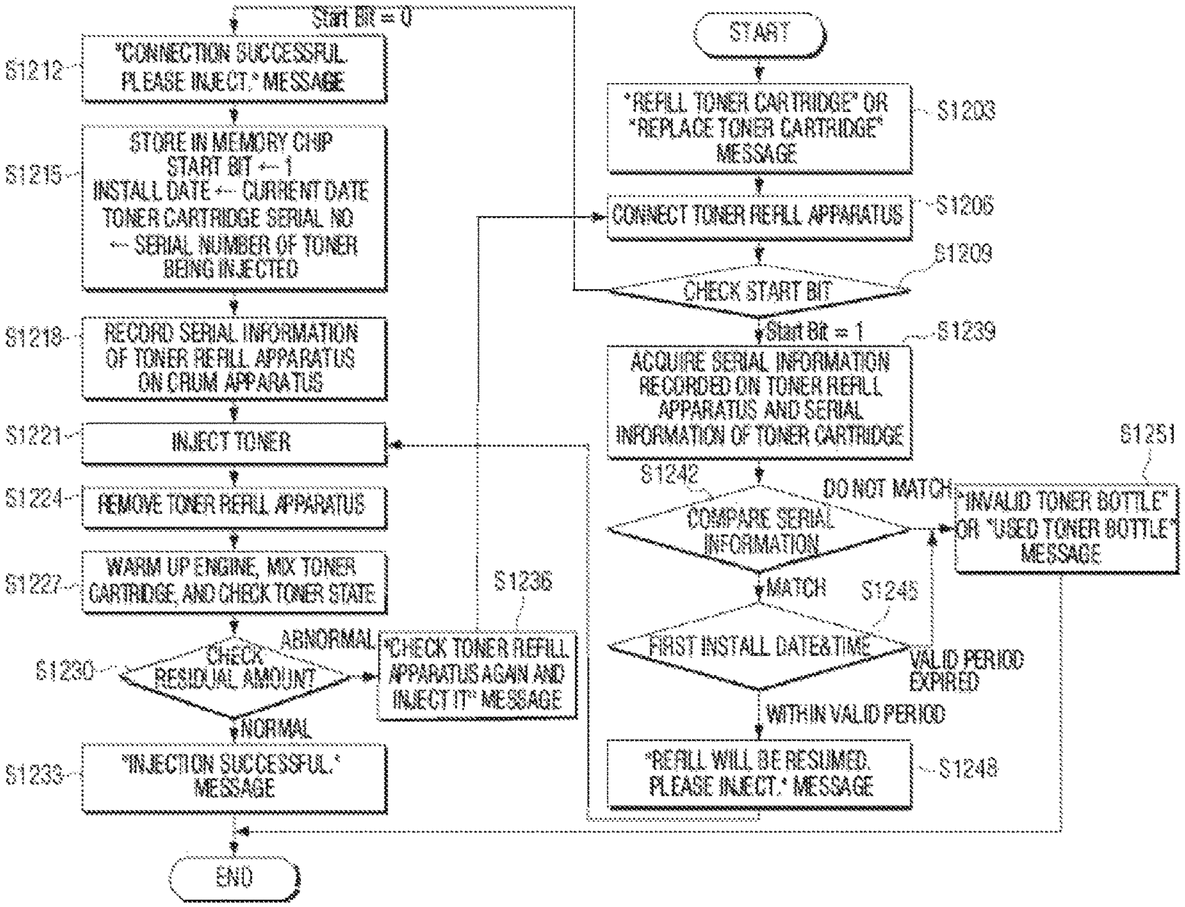

TONER REFILL CONTROL OF IMAGE FORMING APPARATUS

CROSS-REFERENCE TO RELATED PATENT APPLICATIONS

This application is a continuation of U.S. patent application Ser. No. 17/058,271 filed on Oct. 2, 2018, which claims priority from PCT Application No. PCT/KR2018/011673 filed on Oct. 2, 2018, which in turn claims priority to KR Application No. 10-2018-0077703, filed on Jul. 4, 2018, the entireties of which are incorporated by reference herein.

BACKGROUND

An image forming apparatus generally operates to print out print data generated at a terminal, such as a computer, onto a printing paper. Examples of an image forming apparatus may include a copier, a scanner, a printer, a facsimile, or a multi-function peripheral (MFP) in which the above functions are combined and implemented in one apparatus.

An image forming apparatus employing a laser printing method uses a toner to print an image. Toner is used every time an image forming operation is made and exhausted when used for a predetermined period of time or more.

BRIEF DESCRIPTION OF THE DRAWINGS

The above and/or other aspects will become more apparent by reference to examples which are illustrated in the appended drawings. Understanding that these drawings depict only examples and are not therefore to be considered as limiting the scope of the disclosure, the principles herein are described and explained with additional specificity via the use of the accompanying drawings, in which:

FIG. 1 is a diagram illustrating a configuration of an image forming system, according to an example;

FIG. 2 is a block diagram illustrating a brief configuration of an image forming apparatus, such as the image forming apparatus of FIG. 1, according to an example;

FIG. 3 is a block diagram illustrating a configuration of an image forming apparatus, such as the image forming apparatus of FIG. 1, according to an example;

FIG. 4 is a diagram illustrating a configuration of a print engine, such as the print engine of FIG. 2, according to an example;

FIG. 5 is a diagram illustrating a shape of a toner cartridge, such as the toner cartridge of FIG. 2, according to an example;

FIG. 6 is a diagram illustrating a toner refill apparatus, such as the toner refill apparatus of FIG. 1, according to an example;

FIG. 7 is a diagram illustrating an electrical connection between an image forming apparatus and a toner cartridge, according to an example;

FIG. 8 is a diagram illustrating information stored in a memory chip of a toner refill apparatus, according to an example;

FIG. 9 is a diagram illustrating information stored in a customer replaceable unit monitoring (CRUM) apparatus of a toner cartridge, according to an example;

FIG. 10 is a flowchart provided to explain a communication method, according to an example;

FIG. 11 is a flowchart provided to explain a toner refill operation, according to an example; and FIG. 12 is a flowchart provided to explain a toner refill operation, according to an example.

Throughout the drawings, it should be noted that like reference numbers are used to depict the same or similar elements, features, parts, components, and structures and thus, a repeated description thereof may be omitted.

DETAILED DESCRIPTION

One or more examples will be described below with reference to the accompanying drawings. The examples described below may be modified and implemented in various different forms. In order to more clearly describe the features of the examples, a detailed description of known matters to those skilled in the art will be omitted.

In the present disclosure, a case in which any one feature is connected with another feature includes a case in which the features are directly connected with each other and a case in which the features are indirectly connected (e.g., electrically connected) with each other with other features interposed therebetween. Further, when a certain feature is stated as "comprising" another feature, unless otherwise stated, this means that the certain feature may include still another feature, rather than foreclosing the same.

The term "image forming job" as used herein may mean various jobs related to an image (e.g., printing, copying, scanning, or faxing), such as forming an image or creating/storing/transmitting an image file. In addition, the term "job" may mean not only an image forming operation but also a series of processes necessary for performing an image forming operation.

An image forming apparatus generally operates to print out print data generated at a terminal, such as a computer, onto a printing paper. An example of an image forming apparatus includes a copier, a scanner, a printer, a facsimile, and a multi-function printer (MFP) that provides combined functionality of at least two of the single apparatuses. The image forming apparatus may refer to any apparatus capable of performing an image forming operation, such as a printer, a copier, a scanner, a fax machine, an MFP, a display apparatus, or the like.

In addition, "print data" may refer to data that is converted into a format printable in a printer. Meanwhile, if a printer supports direct printing, the file itself may be print data.

In addition, "user" may refer to a person who performs an operation related to an image forming operation using an image forming apparatus or a device connected to the image forming apparatus via wire or wirelessly. In addition, "manager" may refer to a person who has the authority to access all functions and the system of the image forming apparatus. The "manager" and the "user" may be the same person.

FIG. 1 is a diagram illustrating a configuration of an image forming system, according to an example.

Referring to FIG. 1, an image forming system 1000 may include an image forming apparatus 100 and a toner refill apparatus 400.

The image forming apparatus 100 may carry out a print job using a toner stored in a toner cartridge.

The image forming apparatus 100 may refill the toner in the toner cartridge by using the toner refill apparatus 400. The image forming apparatus 100 may communicate with the toner refill apparatus 400 and identify whether the toner refill apparatus 400 is available. Examples of a constitution and operation of the image forming apparatus 100 will be described below by referring to FIGS. 2 and 3.

The toner refill apparatus 400 is an apparatus which provides a toner to the image forming apparatus 100. In addition, the toner refill apparatus 400 may include a memory chip 410 which stores information of the toner refill apparatus 400.

The toner refill apparatus 400 may be referred to as a refill bottle. The memory chip 410 may be referred to as a memory, a refill bottle chip, etc. An example composition and operation of the toner refill apparatus 400 will be described below by referring to FIG. 6.

As described above, the image forming system 1000 according to an example may refill a toner in the image forming apparatus 100 by using the toner refill apparatus 400.

FIG. 2 is a block diagram illustrating a brief configuration of an image forming apparatus, such as the image forming apparatus of FIG. 1, according to an example.

Referring to FIG. 2, the image forming apparatus 100 may include a communication apparatus 110, a print engine 120, and a processor 130. The print engine 120 may include a toner cartridge 200.

The communication apparatus 110 may be connected to a print control terminal device (not illustrated), and receive print data from the print control terminal device. As an example, the communication apparatus 110 may be formed to connect the image forming apparatus 110 to an external device, and may be connected to the print control terminal device through not only a local area network (LAN) or the Internet but also through a universal serial bus (USB) port or a wireless communication (e.g., Wi-Fi 802.11a/b/g/n, near field communication (NFC), Bluetooth, etc.) port. The communication apparatus 110 may be referred to as a 'transceiver'.

The communication apparatus 110 may communicate with the memory chip 410 attached to the toner refill apparatus 400 of FIG. 1. For example, in a case in which the toner refill apparatus 400 is connected to the toner cartridge 200, a toner container (not illustrated), or a developer (not illustrated), the communication apparatus 110 may communicate with the memory chip 410 of the toner refill apparatus 400. An example in which the toner refill apparatus 400 is connected to the toner cartridge 200 will be described below.

The communication apparatus 110 may be electrically connected to the toner refill apparatus 400 through a plurality of terminals mounted in the toner cartridge 200, or communicate with the memory chip 410 of the toner refill apparatus 400 in a radio frequency identification (RFID) method. An example of a connection with the toner refill apparatus 400 by using a plurality of terminals will be described later with reference to FIG. 6.

When an amount of toner in the toner cartridge 200 is less than or equal to a predetermined amount and it is determined necessary to replace the toner cartridge 200 or get a toner refill, the communication apparatus 110 may notify a management server (not illustrated) or a manager (for example, a terminal device of a manager) of the information.

The print engine 120 may form an image. As an example, the print engine 120 may form an image on an image forming medium on which the image is formed, such as a photosensitive drum, an intermediate transfer belt, or a sheet conveyance belt.

The print engine 120 may include various consumable devices directly or indirectly involved in an image forming job. For example, in the case of a laser image forming apparatus, electrification devices, light exposure devices, developing devices, transcription devices, settling devices, various rollers, belts, organic photo conductor (OPC) drums, etc. may be consumable devices. Besides these, various types of devices that must be replaced after being used in an image forming apparatus, such as a developer, may be defined as consumable devices. One of the consumable devices is a toner cartridge, which may carry out a function of the developer described above. An example configuration and operation of the print engine 120 will be described later with reference to FIG. 4.

The processor 130 may control each unit within the image forming apparatus 100. For example, the processor 130 may control the print engine 120 to perform the print job regarding the received print data when the print data is received from the print control terminal device (not illustrated). The print control terminal device may be an electronic apparatus which provides print data, and may be, for example, a personal computer (PC), a notebook PC, a tablet PC, a smartphone, a server, and the like.

The processor 130 may be implemented as one apparatus, such as a central processing unit (CPU), and may be also implemented as a plurality of apparatuses, such as a clock generating circuit, a CPU, a graphic processor, and the like.

In a case in which a user connects the toner refill apparatus 400 to the image forming apparatus 100, the processor 130 may identify whether the toner refill apparatus 400 is connected to the image forming apparatus 100 (more specifically, the toner cartridge 200). For example, when an electrical connection with the memory chip 410 of the toner refill apparatus 400 is identified, the processor 130 may identify that the toner refill apparatus 400 is connected.

When the toner refill apparatus 400 is connected, the processor 130 may identify whether the toner refill apparatus 400 is available based on information stored in the memory chip 410 of the toner refill apparatus 400. For example, the processor 130 may read information stored in the memory chip 410, and carry out an authentication procedure to identify whether the connected toner refill apparatus 400 is an authorized apparatus based on the information stored in the memory chip 410.

This authentication procedure may be the same as or similar to an authentication method for a customer replaceable unit monitoring (CRUM) apparatus described later with reference to FIG. 3. Alternatively, the authentication for the toner refill apparatus 400 may proceed in a different method from the authentication method for the CRUM apparatus. For example, the authentication procedure for the toner refill apparatus 400 may proceed by using an encryption algorithm of which a security level is relatively low or by using a relatively simple authentication procedure. For example, the processor 130 may carry out an authentication procedure to decode a digital signature stored in the memory chip 410 of the toner refill apparatus 400.

If the toner refill apparatus 400 is an authenticated apparatus, the processor 130 may identify whether the toner refill apparatus 400 is available. For example, the processor 130 may identify whether the toner refill apparatus 400 is an apparatus capable of being used for toner refill, by using start information and cartridge information stored in the toner refill apparatus 400.

In more detail, when start information stored in the memory chip 410 has a preset value or the start information does not have a preset value and the cartridge information stored in the memory chip 410 matches with the information stored in the toner cartridge 200, the processor 130 may identify that the toner refill may proceed.

The start information may include information that indicates whether the toner refill apparatus 400 has ever been connected to the image forming apparatus 100. In an example, the information indicating whether the toner refill apparatus 400 has ever been connected to the image forming apparatus 100 may be a 1-bit code. For example, if the start information has a value of 0, it may indicate that there is no connected history. If the start information has a value of 1, it may indicate that there is a connected history. In another example, a value of 0 or 1 of the start information may be used in a form of indicating different information, and the start information may be implemented as a plurality of bits.

Cartridge information stored in the memory chip 410 may include information indicating whether there is a history of being connected to the image forming apparatus 100. When there is no connected history, the cartridge information may not store particular information. When there is a connected history, the cartridge information may include serial information (e.g., serial information of the toner cartridge 200). In another example, the cartridge information may include unique information which is capable of specifying the image forming apparatus 100 or the toner cartridge 200 mounted on the image forming apparatus 100 described above, such as serial information of the image forming apparatus 100, MAC information of the image forming apparatus 100, and the like, in addition to the serial information of the toner cartridge 200.

In an example, if the start information of the memory chip 410 has a value of 0, the processor 130 may identify that the corresponding toner refill apparatus 400 has no use history and identify that the toner refill apparatus 400 is available. In another example, the processor 130 may identify whether the toner refill apparatus 400 is available based on whether refill time information is stored in the memory chip 410.

The processor 130 may store at least one of serial information, start information, or refill time information of the toner cartridge 200 in the memory chip 410. Through an operation such as the operation described above, the toner refill apparatus 400 may be prevented from being used in another image forming apparatus.

When an error has occurred in a toner refill process, for example, in a case in which a power of the image forming apparatus 100 is turned off in the refill process or only some toners are refilled by mistake of a user, a method for re-using the toner refill apparatus 400 is necessary.

Accordingly, even in a case in which the start information has a value of 1, when the cartridge information stored in the memory chip 410 matches with the cartridge information in the image forming apparatus 100, the processor 130 may identify that the corresponding toner refill apparatus 400 is available.

However, even in this case, to identify that a toner refill apparatus for which a toner refill has been completed but a toner refill time point is considerably long ago is not available, the processor 130 may further identify complete information and refill time information stored in the memory chip 410 of the toner refill apparatus 400 and identify whether the toner refill apparatus 400 is available.

The complete information may include information indicating that a toner injection using the toner refill apparatus 400 has been completed, which may be a 1-bit code. For example, in a case in which the complete information has a value of 0, it may indicate that the use of the toner refill apparatus 400 has not been completed (that is, a residual toner is present). In a case in which the complete information has a value of 1, it may indicate that the use of the toner refill apparatus 400 has been completed. In another example, a value of 0 or 1 of the complete information may be used in a form of indicating different information, and the complete information may be implemented as a plurality of bits.

In an example, the complete information may be included as 2-bit information which is combined with the start information described above. For example, the start/complete information may have values of *j *0, "10" and "11". The value *j*00" may indicate that the toner refill apparatus 400 has nhistory of being connected to the image forming apparatus 100. The value "10" may indicate that the toner refill apparatus 400 has a history of being connected to the image forming apparatus 100 but has not completed a toner refill. The value "11" may indicate that the toner refill apparatus 400 has a history of being connected to the image forming apparatus 100 and has completed a toner refill.

In addition, the refill time information may include information indicating time information of a time point at which the toner refill apparatus 400 is initially connected to the image forming apparatus 100. For example, the refill time information may include information relating to a date and time of a time point at which the toner refill apparatus 400 is connected to the image forming apparatus 100.

Accordingly, even in a case in which the start information has a value of 1, if the cartridge information stored in the memory chip 410 matches with the cartridge information stored in the image forming apparatus 100 (or the CRUM apparatus) and the complete information of the memory chip 410 does not have a value of 1, the processor 130 may identify that the toner refill apparatus 400 is available.

Even in a case in which the start information is 1, the complete information is 0, and the cartridge information matches, when the refill time information exceeds a preset time, the processor 130 may identify that the toner refill apparatus 400 is not available.

When it is identified that the toner refill apparatus 400 is available, the processor 130 may control the toner cartridge 200 such that a toner in the toner refill apparatus 400 is injected into the toner cartridge 200. The toner cartridge 200 may include a hole which is capable of receiving a toner and a locking member, such as an electric locking member, which opens and closes the corresponding hole.

Accordingly, when it is identified that the toner refill apparatus 400 is available, the processor 130 may transfer, to a toner cartridge 200, a control command to control the locking member of the toner cartridge 200 to open a hole.

In addition, when the toner refill is completed, the processor 130 may store information relating to the completion of toner refill in the memory chip 410. For example, when the toner refill is completed, the processor 130 may update complete information of the memory chip 410 described above, to a value of 1.

Although the above examples illustrate and explain a simple constitution of an image forming apparatus, various units may be additionally included in other example implementations. This will be described below with reference to FIG. 3.

FIG. 3 is a block diagram illustrating a configuration of an image forming apparatus, such as the image forming apparatus of FIG. 1, according to an example.

Referring to FIG. 3, the image forming apparatus 100 may include the communication apparatus 110, the print engine 120, the processor 130, a memory 140, a display 150, an input apparatus 160, and a sensor 170.

The communication apparatus 110 is explained in FIG. 2, and thus will not be further explained below for the sake of brevity. In addition, the processor 130 and the print engine 120 are explained in FIG. 2, and thus will not be further explained below for the sake of brevity. Only added elements in FIG. 3 will be explained below.

The processor 130 may communicate with a CRUM apparatus 300. For example, the processor 130 may perform communication for authentication for the CRUM apparatus 300 and management of data stored in the CRUM apparatus 300.

The processor 130 may communicate with the CRUM apparatus 300 in an I2C method or an eI2C method. The I2C method may be a standardized serial communication method which uses a data (SDA) signal and a clock signal. The eI2C method changes the I2C method so that the clock signal has periodicity in the idle period as well. The eI2C method may be referred to as various names, such as a 3 contact point I2C method, an encoding I2C method, and the like.

The CRUM apparatus 300 may be an apparatus which stores apparatus information of a consumable apparatus (e.g., the toner cartridge 200) and the like, and may be referred to as a memory, a memory chip, a chip apparatus, a toner cartridge memory, and the like.

In addition, the processor 130 may communicate with the memory chip 410 of the toner refill apparatus 400. In a case in which the toner cartridge 200 includes terminals for connection with the toner refill apparatus 400, the processor 130 may communicate with the memory chip 410 of the toner refill apparatus 400 by using the I2C method or the eI2C method in the same manner as the CRUM apparatus 300 described above.

In addition, the processor 130 may perform encryption for data transferred to the CRUM apparatus 300 or a memory chip 410 of the toner refill apparatus 400 and perform communication. For the encryption algorithm, various encoding algorithms such as Rivest-Shamir-Adleman (RSA), elliptic-curve cryptography (ECC) asymmetric algorithm, ARIA, triple data encryption algorithm (TDES), SEED, advanced encryption standard (AES) symmetric key algorithm, etc. may be used.

In a case in which the processor 130 communicates with a memory chip of the connected CRUM apparatus 300 or the memory chip 410 of the connected toner refill apparatus 400 by using the eI2C method, to perform communication with the CRUM apparatus 300 or the memory chip 410, the processor 130 may generate a clock signal, and generate a data signal and transmit it or receive a data signal.

In addition, the processor 130 may perform an authentication procedure to identify whether the mounted CRUM apparatus is an authorized apparatus based on information provided from the CRUM apparatus 300. In addition, the processor 130 may identify whether it is necessary to perform a toner refill based on the information provided from the CRUM apparatus 300 (e.g., information relating to a residual amount of consumables).

If a toner refill is necessary, the processor 130 may control the display 150 to display a message indicating the necessity of toner refill.

The cartridge information of the image forming apparatus 100 described above may be stored in the CRUM apparatus 300 attached to the toner cartridge 200, or may be stored in the memory 140 of the image forming apparatus 100. If the cartridge information is stored in the CRUM apparatus 300, the processor 130 may read cartridge information stored in the CRUM apparatus 300.

In addition, the processor 130 may store information of the toner refill apparatus 400 in the CRUM apparatus 300. The information stored in the CRUM apparatus 300 may be intrinsic information of the toner refill apparatus 400 (e.g., a serial number of the toner refill apparatus 400).

As described above, the processor 130 may store information of the toner refill apparatus 400 (e.g., serial information of the toner refill apparatus) in the CRUM apparatus 300. Accordingly, it is possible to identify whether the toner refill apparatus 400 is available by using the information of the toner refill apparatus 400 stored in the CRUM apparatus 300.

As an example, in a case in which serial information of the toner refill apparatus 400 is stored in the CRUM apparatus 300, the processor 130 may compare the serial information of the toner refill apparatus 400 stored in the CRUM apparatus 300 with the information of the toner refill apparatus 400 (i.e., serial information of the toner refill apparatus) with each other and identify whether the toner refill apparatus 400 is available.

When it is identified that the toner refill apparatus 400 is not available, the processor 130 may control the display 150 to display a message indicating that the toner refill apparatus 400 is not available. The message may include not only the inability of using the toner refill apparatus 400, but also the reason thereof. For example, the message may include information relating to whether an unauthentic toner refill apparatus 400 is connected, whether it is a product for which toner refill has been performed already, whether toner refill has not been completed but a use period has been expired, and the like.

In a case in which an error occurs in a toner refill process, the processor 130 may control the display 150 to display a message indicating that it is necessary to re-perform a toner refill.

As an example, when a toner refill process is performed, the processor 130 may store, in the memory 140, information that the toner refill is in progress. When the toner refill is completed, the processor 130 may delete the information indicating that the toner refill is in progress from the memory 140. Accordingly, the processor 130 may identify that the information indicating that the toner refill is in progress is stored in the memory 140 and that an error occurred in the toner refill process during the initial booting of the image forming apparatus 100, and may notify the user of the fact that it is necessary to re-perform the toner refill.

When the toner refill is processed, the processor 130 may continuously identify whether the toner refill is completed. As an example, when an amount of toner detected in the toner cartridge 200 is changed to more than a predetermined value, the processor 130 may identify that the toner refill is completed using a sensor sensing a toner amount in the toner cartridge 200.

In an example, the processor 130 may identify whether the toner refill is completed based on whether a magnetic substance is sensed by the sensor 170 by using a sensor 170 sensing a magnetic substance disposed at a preset location of the toner refill apparatus 400.

Alternatively, the processor 130 may identify whether the toner refill apparatus 400 is detached from the toner cartridge 200 based on an electrical connection state between the toner refill apparatus 400 and the toner cartridge 200 and identify whether the toner refill is completed. In this case, the processor 130 may perform an additional identification as to whether the toner refill is completed based on a toner amount filled in the toner cartridge 200 as described above.

If the toner refill apparatus 400 is detached from the toner cartridge 200 but an increased toner amount does not reach a predetermined amount, the processor 130 may control the display 150 to display a message indicating that it is necessary to re-connect the toner refill apparatus 400 and proceed with an additional injection.

When the toner refill is completed, the processor 130 may control the display 150 to display a message requesting for detachment from the image forming apparatus 100.

When the toner refill is completed, the processor 130 may newly update a toner amount of the toner cartridge 200. As an example, the processor 130 may change a toner amount newly sensed using a sensor provided in the toner cartridge 200 to a toner amount of the toner cartridge 200.

The processor 130 may store the newly-changed toner amount in the CRUM apparatus 300 of the toner cartridge 200. In addition, the processor 130 may store information of the connected toner refill apparatus 400 in the CRUM apparatus 300. In addition, information, such as the number of toner refills and the like, may be stored in the CRUM apparatus 300.

The memory 140 may store print data which is received through the communication apparatus 110. The memory 140 may store history information of a print job that is performed in the image forming apparatus 100.

In addition, the memory 140 may store information relating to a toner refill history for the toner cartridge 200. When the toner refill is in progress, the memory 140 may store information indicating that the refill is in progress. This information may be deleted once the toner refill is completed.

The memory 140 may be implemented by a storage medium in the image forming apparatus 100 or an external storage medium, for example, a removable disk including a USB memory or a web server through a network.

In another example, the memory 140 may include a plurality of memory elements. As an example, the memory 140 may include a first memory which stores data required for performing operations of the image forming apparatus 100 and a second memory which stores information relating to the CRUM apparatus 300 or the toner refill apparatus 400. The second memory may be a non-volatile memory, such as an electrically erasable programmable read-only memory (EEPROM).

The display 150 may display various information provided from the image forming apparatus 100. As an example, the display 150 may display a user interface window to select various functions provided by the image forming apparatus 100.

The display 150 may display a control menu for performing a function of the image forming apparatus 100.

In addition, the display 150 may display information relating to consumables. As an example, when it is identified that replacement of consumables is necessary, the display 150 may display replacement information and display an expected time of replacement. In addition, when a toner of the toner cartridge 200 from among the consumables becomes less than or equal to a preset amount, the display 150 may display that a toner refill is necessary.

The display 150 may display information regarding how to use the toner refill apparatus 400. When it is identified that the connected toner refill apparatus 400 is not available, the display 150 may display a message indicating that the refill cannot be performed.

The input apparatus 160 may receive an input of user's function selection, a control command for the corresponding function, and the like. The function may include printing, copying, scanning, fax transmission, and the like. Such function control command may be received through a control menu displayed in the display 150.

The print engine 120 may form an image. The image forming apparatus 100 may carry out a print job using a toner stored in a toner cartridge 200.

The toner cartridge 200 is an apparatus providing a toner to a developer, and a toner may be refilled by the toner refill apparatus 400. In addition, the CRUM apparatus 300 storing information relating to the toner cartridge 200 may be mounted on the toner cartridge 200. The CRUM apparatus 300 may be attached to the toner cartridge 200 or may be additionally mounted on the image forming apparatus 100.

Examples of a configuration and operation of the toner cartridge 200 will be described later with reference to FIG. 5.

The sensor 170 may sense a particular posture of the toner refill apparatus 400. As an example, the sensor 170 may include a hall sensor detecting a magnetic substance. The sensor 170 may sense a magnetic body which is mounted at a preset location of the toner refill apparatus 400. For example, the sensor 170 may detect a case where the toner refill apparatus 400 is vertically disposed at a predetermined location on the image forming apparatus 100 based on a width direction of the image forming apparatus 100.

As described above, the image forming apparatus 100 according to an example may refill a toner and use it without replacing the toner cartridge 200. It is possible to reuse the toner refilling apparatus 400 when the same is used again in the same image forming apparatus 100, even when an error in the refilling process occurs.

In FIGS. 2 and 3, it is illustrated and described that the image forming apparatus 100 includes one toner cartridge 200. In another example, the image forming apparatus 100 may include a plurality of toner cartridges. Correspondingly, a plurality of CRUM apparatuses may be mounted on the image forming apparatus 100.

In FIGS. 2 and 3, it is described that the processor 130 directly communicates with the CRUM apparatus 300 and the toner refill apparatus 400. However, in another example, the processor 130 may communicate with the CRUM apparatus 300 and a memory chip 410 of the toner refill apparatus 400 via the communication apparatus 110.

FIG. 4 is a diagram illustrating a configuration of a print engine, such as the print engine of FIG. 2, according to an example.

Referring to FIG. 4, the print engine 120 may include a photosensitive drum 121, a charger 122, an exposure apparatus 123, a toner cartridge 200, a transferring apparatus 125, and a fixing apparatus 128.

An electrostatic latent image is formed in the photosensitive drum 121. The photosensitive drum 121 may be referred to as a photosensitive drum, a photosensitive belt, and the like, according to forms.

The charger 122 charges the surface of the photosensitive drum 121 to a uniform potential. The charger 122 may be implemented as a corona charger, a charging roller, a charging brush, and the like.

The exposure apparatus 123 may change the surface potential of the photosensitive drum 121 based on information on an image to be printed to form an electrostatic latent image on the surface of the photosensitive drum 121.

The toner cartridge 200 accommodates a developing agent therein, and develops the electrostatic latent image into a visible image through supply of the developing agent onto the electrostatic latent image. The toner cartridge 200 may include a developing roller 127 for supplying the developing agent to the electrostatic latent image. Examples of a shape and a configuration of the toner cartridge 200 will be described later with reference to FIG. 5.

The visible image which is formed on the photosensitive drum 121 is transferred to a recording medium (P) by the transferring apparatus 125 or an intermediate transfer belt (not illustrated).

The fixing apparatus 128 fixes a visible image on the recording medium P by applying heat and/or pressure to a visible image on the recording medium P. The printing operation is completed by this series of processes.

The developing agent described above is used every time an image forming operation is made and exhausted when used for or more than a predetermined number of times. However, since a toner cartridge includes a variety of components, a method for refilling a toner without replacing the toner cartridge is desired. A toner cartridge which is capable of performing a toner refill and an apparatus for refilling a toner in the toner cartridge will be described below, with reference to FIGS. 5 and 6.

FIG. 5 is a diagram illustrating a shape of a toner cartridge, such as the toner cartridge of FIG. 2, according to an example.

Referring to FIG. 5, the toner cartridge 200 includes a toner. The toner cartridge 200 may include first terminals 210 to be electrically connected to the image forming apparatus 100, second terminals 220 to be electrically connected to the toner refill apparatus 400, and a hole 230 to receive a toner refill.

When the toner cartridge 200 is mounted on the image forming apparatus 100, the first terminals 210 may be electrically connected to internal terminals of the image forming apparatus 100. In this case, the first terminals 210 may transmit and receive not only a signal for communication between the image forming apparatus 100 and the toner cartridge 200 but also a signal for communication with the CRUM apparatus 300 or toner refill apparatus 400 attached to the toner cartridge 200.

When the toner refill apparatus 400 is connected to the hole 230 for refill, the second terminals 220 may be electrically connected to terminals of the memory chip 410 of the toner refill apparatus 410. In this regard, the second terminals may transmit and receive a signal between the image forming apparatus 100 and the memory chip 410.

An example of a connection form between the first terminals 210 and the second terminals 220 will be described below, with reference to FIG. 7.

The hole 230 is a hole for receiving a toner from the toner refill apparatus 400. A locking member (not illustrated) which electrically opens and closes the hole may be disposed at an upper portion of the hole 230 or at the middle of the hole. The locking member (not illustrated) is an apparatus which opens and closes a hole. In an example, the locking member is an apparatus which opens and closes a hole according to an electrical signal, which may be driven by an apparatus such as a solenoid and the like.

Accordingly, only when the availability of the toner refill apparatus 400 is identified, the toner cartridge 200 may selectively receive injection of a toner of the toner refill apparatus 400.

In addition, the toner cartridge 200 may include a sensor (not illustrated) for sensing a toner amount in the toner cartridge 200. Using the sensor (not illustrated), not only a toner amount in the toner cartridge 200 can be identified but also whether a toner has been normally injected through a toner refill process and the like can be identified.

FIG. 6 is a diagram illustrating a toner refill apparatus, such as the toner refill apparatus of FIG. 1, according to an example.

Referring to FIG. 6, the toner refill apparatus 400 may have the shape of a bottle capable of containing a toner, and have an outlet capable of injecting a toner contained in the bottle into a hole of the toner cartridge 200.

The memory chip 410 may be disposed on one side of the toner refill apparatus 400. As an example, the memory chip 410 may be disposed at a location where the memory chip 410 may be connected to the second terminals when an inlet of the toner refill apparatus 400 is in contact with the hole 230 of the toner cartridge 200. In the illustrated example, the memory chip 410 is disposed on a side surface of a bottle, but it may be implemented such that the memory chip 410 is disposed at the inlet.

In addition, the memory chip 410 may be a memory chip storing information of the toner refill apparatus 400, and may include a plurality of terminals 412.

A memory 411 may store information of the toner refill apparatus 400. For example, the memory 411 may store information relating to serial information, manufacturer, manufacturing date, information of a toner, and the like of the toner refill apparatus 400. In addition, the memory 411 may store history information related to toner refill. As an example, the memory 411 may store the start information, complete information, refill time information, cartridge information of the image forming apparatus 100, and the like, as described above.

In addition, the information stored in the memory 411 may be encrypted and stored.

The memory 411 may be a non-volatile memory, such as an electrically erasable programmable read-only memory (EEPROM).

The plurality of terminals 412 may be terminals for electrically connecting the memory 411 to the processor 130 and the image forming apparatus 100. An example of a connection between the plurality of terminals 412 and the image forming apparatus 100 will be described below, with reference to FIG. 7.

FIG. 7 is a diagram illustrating an electrical connection between an image forming apparatus and a toner cartridge, according to an example.

Referring to FIG. 7, a communication apparatus 110 (or terminals) for connection with the toner cartridge 200 may be provided in a main body of the image forming apparatus 100.

In addition, terminals for connection with the image forming apparatus 100 and terminals for connection with the memory chip 410 may be disposed on the toner cartridge 200.

As an example, terminals 181, 182 and 183 for communication with the CRUM apparatus 300 may be provided in the main body (or the communication apparatus 110) of the image forming apparatus 100. In addition, the respective terminals 181, 182 and 183 may be connected to terminals on the CRUM apparatus 300 side via cables 191, 192 and 193.

In the illustrated example, it is described that the terminals 181, 182 and 183 are elements included in the communication apparatus 110. However, the terminals 181, 182 and 183 may be directly connected to the processor 130. In addition, in the illustrated example, it is described that the terminals of the main body of the image forming apparatus 100 and the CRUM apparatus 300 are directly connected to each other. However, in another example, it may be such that the processor 130 and the toner cartridge 200 are electrically connected and that the CRUM apparatus 300 is connected via the toner cartridge 200.

The CRUM apparatus 300 may include terminals 301, 302 and 303 for communication with the processor 130 provided in the image forming apparatus 100. The terminals 301, 302 and 303 may include a clock terminal 301, a data terminal 302, and a grounding terminal 303.

The clock terminal 301, the data terminal 302 and the grounding terminal 303 may be electrically connected to the three terminals 181, 182 and 183 provided in the main body of the image forming apparatus 100 via a cable.

In addition, additional terminals 185, 186 and 187 for communication with the toner refill apparatus 400 may be provided in the main body of the image forming apparatus 100. In addition, the respective terminals 185, 186 and 187 may be connected to terminals on the toner cartridge 200 side via cables 195, 196 and 197.

First terminals 210 on the toner cartridge 200 side may be electrically connected to second terminals 220 via an electric line. In an example, the first terminals 210 may include three terminals 211, 212, and 213, and the second terminals 220 may include three terminals 221, 222, and 223, which are respectively connected to each other. When the toner refill apparatus 400 is connected to the toner cartridge 200, the second terminals 221, 222 and 223 may be electrically connected to the plurality of terminals 412 disposed on the memory chip 410 of the toner refill apparatus 400.

In the illustrated example, a form in which terminals are connected via a cable is illustrated. However, in another example, terminals may be connected in a form in which they are directly in contact with each other. In the illustrated example, a form in which the CRUM apparatus 300 is attached to the toner cartridge 200 is illustrated. However, in another example, the CRUM apparatus 300 and the toner cartridge 200 may be mounted on the image forming apparatus 100 at positions spaced from each other.

In FIG. 7, it is described that the image forming apparatus 100 includes three terminals 181, 182 and 183 and that the CRUM apparatus 300 includes three terminals 301, 302 and 303. However, in a case in which the CRUM apparatus 300 operates in the I2C method, the image forming apparatus 100 and the CRUM apparatus 300 may further include a power terminal. That is, each of the image forming apparatus 100 and the CRUM apparatus 300 may include four terminals. It is described that the memory chip 410 is connected via three terminals. However, in another example, the memory chip 410 may be connected via four terminals.

FIG. 8 is a diagram illustrating information stored in a memory chip of a toner refill apparatus, according to an example.

Referring to FIG. 8, the memory chip 410 may include refill time information, start information, complete information, intrinsic information of the toner refill apparatus 400, and intrinsic information of the toner cartridge 200.

The refill time information may include information which is stored by the image forming apparatus 100 in a case in which the toner refill apparatus 400 is connected to the image forming apparatus 100 (or the toner cartridge 200), which may store a time point at which the toner refill apparatus 400 (or the toner cartridge 200) is connected, for example, date and time information of a time point at which a refill starts.

The start information may include information indicating whether the toner refill apparatus 400 has ever been connected to the image forming apparatus 100 as described above, which may be a 1-bit code.

The complete information may include information indicating that a toner refill using the toner refill apparatus 400 has been completed as described above, which may be a 1-bit code.

The intrinsic information of the toner refill apparatus 400 may include intrinsic information of the toner refill apparatus 400 for identifying the toner refill apparatus 400, which may include serial information of the toner refill apparatus 400.

The intrinsic information of the toner cartridge may include intrinsic information for the toner cartridge 200 of the image forming apparatus 100 to which the toner refill apparatus 400 is connected. In a case in which the toner refill apparatus 400 performs a toner refill, the intrinsic information of the toner cartridge may include serial information of the toner cartridge in which a toner is refilled.

In the example above, it is illustrated and described that five pieces of information are stored in the memory chip 410. However, in another example, various information other than the information described above may be further stored. For example, the memory chip 410 may further store a type of toner included in the toner refill apparatus 400 (color information), manufacturer information, use period information, an authentic identification code, and the like. In addition, in another example, some of the five pieces information described above are omitted.

FIG. 9 is a diagram illustrating example information stored in a CRUM apparatus of a toner cartridge, according to an example.

Referring to FIG. 9, the CRUM apparatus 300 may include intrinsic information and complete information of the toner refill apparatus 400.

The intrinsic information of the toner refill apparatus 400 may include intrinsic information of the toner refill apparatus 400 for identifying the toner refill apparatus 400, which may include serial information of the toner refill apparatus 400. The serial information of the toner refill apparatus 400 may be stored in the CRUM apparatus 300 under the control of the processor 130 at a time point at which the toner refill apparatus 400 is initially connected to the image forming apparatus 100.

The complete information may include information indicating that a toner refill using the toner refill apparatus 400 has been completed, which may be a 1-bit code.

The CRUM apparatus 300 may store, in addition to the information described above, information relating to a consumable apparatus, information of the CRUM apparatus 300, various characteristic information with respect to the image forming apparatus 100, and the like, and use information or a program related to performing an image forming job.

FIG. 10 is a flowchart provided to explain a communication method, according to an example.

Referring to FIG. 10, information stored in the memory chip 410 attached to the toner refill apparatus 400 is received at operation S1010. As an example, in a case in which the memory chip 410 of the toner refill apparatus 400 is connected to the image forming apparatus 100 via a cable as illustrated in FIG. 6, the processor 130 may receive information stored in the memory chip 410 by using a cable line. In this case, the processor 130 may decode encrypted information.

It is identified whether the toner refill apparatus 400 is available based on the received information, at operation S1020. An example operation to identify whether the toner refill apparatus 400 is available is described above with reference to FIG. 2 and thus, an overlapped description will be omitted.

In addition, when it is identified that the toner refill apparatus 400 is available, serial information, start information, and refill time information of the toner cartridge 200 is stored in the memory chip 410, at operation S1030. The processor 130 may encrypt information to be stored, and store the encrypted information in the memory chip 410.

A communication method according to an example may include storing serial information, start information, refill time information of the toner cartridge 200, and the like, and thus, thereafter, it can be easily identified whether the toner refill apparatus 400 is available in another image forming apparatus using the corresponding toner refill apparatus 400 or the same image forming apparatus.

The communication method in the image forming apparatus described above may be implemented as a program and provided to an image forming apparatus. In particular, the program including a communication method in an image forming apparatus may be stored in a non-transitory computer readable medium and provided therein. The non-transitory computer readable medium refers to a medium that stores data semi-permanently rather than storing data for a very short time, such as a register, a cache, a memory, etc., and is readable by an apparatus.

FIG. 11 is a flowchart provided to explain a toner refill operation, according to an example.

FIG. 11 illustrates a toner refill operation in a case in which the completion of toner refill of the toner refill apparatus 400 can be identified by the image forming apparatus 100. That is, a toner refill operation in a case in which the image forming apparatus 100 includes a sensor of FIG. 3 is described.

Referring to FIG. 11, when an amount of toner in a toner cartridge is insufficient, the necessity of replacement of the toner cartridge and a toner refill may be displayed at operation S1103.

In a case in which a user connects the toner refill apparatus 400 to the toner cartridge 200 to proceed with a toner refill, at operation S1106, values of a start bit and a complete bit may be identified by reading information stored in the memory chip 410 of the toner refill apparatus 400, at operation S1109.

If the values of the start information and the complete information are 0 and 0, respectively, that is, when the connected toner refill apparatus 400 has never been used before, it may be identified that the toner refill apparatus 400 is available and a message requesting a toner injection may be displayed, at operation S1112.

The image forming apparatus 100 may change start information of the memory chip 410 to a value of 1, and store information relating to a current date and time and information of the toner cartridge 200 in the memory chip 410, at operation S1115.

In addition, the image forming apparatus 100 may store serial information of the toner refill apparatus 400 in the CRUM apparatus 300, at operation S1118.

The image forming apparatus 100 may open or close a hole of the toner cartridge 200 and receive a toner refill, at operation S1121. Accordingly, a toner located in the toner refill apparatus 400 may be moved to the toner cartridge 200.

As described with reference to FIG. 3, the image forming apparatus 100 may use a sensor sensing a toner amount in the toner cartridge 200, use a sensor sensing a magnetic substance disposed at a preset location of the toner refill apparatus 400, or identify whether a toner refill is completed based on an electrical connection state between the toner refill apparatus 400 and the toner cartridge 200.

Accordingly, when a sufficient amount of toner in the toner refill apparatus 400 is transferred to the toner cartridge 200, the image forming apparatus 100 may change complete information of the memory chip 410 from 0 to 1, at operation S1124.

In addition, the image forming apparatus 100 may display a message requesting to remove the toner refill apparatus 400 since a toner refill is completed, at operation S1127.

If the values of the start information and the complete information are 1 and 0, respectively, that is, if the connected toner refill apparatus 400 has been connected but a toner refill has not yet been completed, serial information stored in the toner refill apparatus 400 and serial information of the image forming apparatus 100 are read at operation S1130, and it may be identified whether the serial information stored in the toner refill apparatus 400 and the serial information of the image forming apparatus 100 are identical to each other, at operation S1133.

If the serial information are identical to each other, refill time information stored in the toner refill apparatus 400 may be identified at operation S1136, and if within a valid date, it may be identified that a toner refill is available and a message requesting to proceed with a toner injection may be displayed, at operation S1139.

If the values of the start information and the complete information are 1 and 1, respectively, if the serial information are not identical to each other, or if a valid date is elapsed, it may be identified that the toner refill apparatus 400 is not an effective toner refill apparatus 400 and a message indicating that a toner refill is not available using the toner refill apparatus 400, at operation S1142. In that case, and a toner refill operation may be terminated.

FIG. 12 is a flowchart provided to explain a toner refill operation, according to an example.

FIG. 12 illustrates a toner refill operation in a case in which the completion of toner refill of the toner refill apparatus 400 cannot be identified by the image forming apparatus 100. That is, a toner refill operation in a case in which the image forming apparatus 100 does not include a sensor of FIG. 3 is described.

Referring to FIG. 12, when an amount of toner in the toner cartridge is insufficient, the necessity of replacement of the toner cartridge or a toner refill may be displayed at operation S1203.

In a case in which a user connects the toner refill apparatus 400 to the toner cartridge 200 to proceed with a toner refill, at operation S1206, values of a start bit and a complete bit may be identified by reading information stored in the memory chip 410 of the toner refill apparatus 400, at operation S1209.

If a value of the start information is 0, that is, when the connected toner refill apparatus 400 has never been used before, it may be identified that the toner refill apparatus 400 is available and a message requesting a toner injection may be displayed, at operation S1212.

The image forming apparatus 100 may change start information of the memory chip 410 to a value of 1, and store information relating to a current date and time and information of the toner cartridge 200 in the memory chip 410, at operation S1215.

In addition, the image forming apparatus 100 may store serial information of the toner refill apparatus 400 in the CRUM apparatus 300, at operation S1218.

In addition, the image forming apparatus 100 may open or close a hole of the toner cartridge 200 and receive a toner refill, at operation S1221. Accordingly, a toner located in the toner refill apparatus 400 may be moved to the toner cartridge 200.

If a user detaches the toner refill apparatus 400 from the image forming apparatus 100, at operation S1224, the image forming apparatus 100 may identify a toner state by using a toner amount sensor in the toner cartridge 200, at operations S1227 and S1230. As an example, the image forming apparatus 100 may perform a warm up, including mixing of a toner cartridge, and determine a toner state including an amount of toner in the toner cartridge 200.

If the identified toner amount has increased by more than a predetermined amount, a message indicating that the refill has been successfully performed may be displayed at operation S1233.

If an identified toner amount has not increased by more than a predetermined amount, it may be considered that a toner refill has not been completed and a message requesting reconnection may be displayed, at operation S1236.

If a value of the start information is 1, that is, if the connected toner refill apparatus 400 has ever been connected, serial information stored in the toner refill apparatus 400 and serial information of the image forming apparatus 100 are read at operation S1239, and it may be identified whether the serial information stored in the toner refill apparatus 400 and the serial information of the image forming apparatus 100 are identical to each other, at operation S1242.

If the serial information are identical to each other, refill time information stored in the toner refill apparatus 400 may be identified at operation S1245, and if within a valid date, it may be identified that a toner refill is available and a message requesting to proceed with a toner injection may be displayed, at operation S1248.

If the serial information are not identical to each other or a valid period has elapsed, it may be identified that the toner refill apparatus 400 is not a valid toner refill apparatus 400, and a message may be displayed indicating that it is impossible to perform a toner refill using the toner refill apparatus 400 at operation S1251. In that case, and a toner refill process may be terminated.

According to the examples of toner refill methods described above, a toner refill may be performed without replacing a toner cartridge, thereby reducing costs. Further, serial information, start information, refill time information of a toner cartridge, and the like may be stored in a toner refill apparatus, and thus, thereafter, it can be identified whether the toner refill apparatus is available in another image forming apparatus using the corresponding toner refill apparatus or the same image forming apparatus. In addition, a toner refill method may include identifying whether a toner refill is completed based on an increased toner amount even in a case in which a sensor for identifying the completion of a toner refill of a toner refill apparatus is not included.

The foregoing examples and advantages are merely exemplary and are not to be construed as limiting the present disclosure. The present disclosure can be readily applied to other types of apparatuses. Also, the description of the examples of the present disclosure is intended to be illustrative, and not to limit the scope of the claims, and many alternatives, modifications, and variations will be apparent to those skilled in the art.

What is claimed is:

1. A refill apparatus comprising:

a container to be connected to an image forming apparatus; and a memory coupled to the container and having start information and complete information stored thereon, the start information indicative of whether the refill apparatus has been previously connected to the image forming apparatus and the complete information indicative of whether refill from the refill apparatus has been completed, wherein based on the start information indicating that the refill apparatus has not been previously connected to the image forming apparatus, the refill apparatus is configured to refill a cartridge of the image forming apparatus, and wherein based on the start information indicating that the refill apparatus has been previously connected to the image forming apparatus and the complete information indicating that the refill using the refill apparatus has not been completed, the refill apparatus is configured to refill the cartridge.

2. The refill apparatus of claim 1, wherein the memory is configured to receive at least one of a serial information of a cartridge of the image forming apparatus or a refill time information of the cartridge from the image forming apparatus in response to the refill apparatus being connected to the image forming apparatus and the start information indicating that the refill apparatus has not been previously connected to the image forming apparatus.

3. The refill apparatus of claim 1, wherein the memory is configured to receive an updated start information from the image forming apparatus in response to the refill apparatus being connected to the image forming apparatus and the start information indicating that the refill apparatus has not been previously connected to the image forming apparatus.

4. The refill apparatus of claim 1, wherein the memory is configured to receive updated complete information from the image forming apparatus in response to the refill apparatus being connected to the image forming apparatus and a successful completion of the refill to a cartridge of the image forming apparatus.

5. The refill apparatus of claim 1, wherein the memory is configured to transmit a serial information stored on the memory to the image forming apparatus in response to the refill apparatus being connected to the image forming apparatus and the start information indicating that the refill apparatus has been previously connected to the image forming apparatus.

6. The refill apparatus of claim 5, wherein the memory is configured to transmit a refill time information of a cartridge of the image forming apparatus to the image forming apparatus in response to the refill apparatus being connected to the image forming apparatus and the serial information stored on the memory matching a serial information stored on the cartridge.

7. The refill apparatus of claim 1, wherein the memory is further configured to store thereon at least one of a serial information of the refill apparatus, a serial information of a cartridge of the image forming apparatus, or a refill time information comprising date and time information of a previous refill.

8. A refill apparatus comprising:

a memory having start information and complete information stored thereon, the start information indicative of whether the refill apparatus has been previously connected to an image forming apparatus and the complete information indicative of whether refill from the refill apparatus has been completed, wherein based on the start information indicating that the refill apparatus has not been previously connected to the image forming apparatus, the refill apparatus is configured to refill a cartridge of the image forming apparatus, and wherein based on the start information indicating that the refill apparatus has been previously connected to the image forming apparatus and the complete information indicating that the refill using the refill apparatus has not been completed, the refill apparatus is configured to refill the cartridge.

9. The refill apparatus of claim 8, wherein the memory is configured to receive an updated start information from the image forming apparatus in response to the refill apparatus being connected to the image forming apparatus and the start information indicating that the refill apparatus has not been previously connected to the image forming apparatus.

10. The refill apparatus of claim 8, wherein the memory chip is configured to receive updated complete information from the image forming apparatus in response to the refill apparatus being connected to the image forming apparatus and a successful completion of the refill to the cartridge.

11. A memory chip for a refill apparatus, the memory chip comprising:

a memory coupled to a container to be connected to an image forming apparatus and to communicate information about the refill apparatus to a printer processor when the refill apparatus is installed on a printer, wherein the memory has start information and complete information stored thereon, the start information indicative of whether the refill apparatus has been previously connected to the printer and the complete information indicative of whether refill from the refill apparatus has been completed, wherein based on the start information indicating that the refill apparatus has not been previously connected to the image forming apparatus, the refill apparatus is configured to refill a cartridge of the image forming apparatus, and wherein based on the start information indicating that the refill apparatus has been previously connected to the image forming apparatus and the complete information indicating that the refill using the refill apparatus has not been completed, the refill apparatus is configured to refill the cartridge.

12. The memory chip of claim 11, wherein the memory is configured to receive at least one of a serial information of a cartridge of the printer or a refill time information of the cartridge from the printer processor in response to the refill apparatus being connected to the printer and the start information indicating that the refill apparatus has not been previously connected to the printer.

13. The memory chip of claim 11, wherein the memory is configured to receive an updated start information from the printer in response to the refill apparatus being connected to the printer and the start information indicating that the refill apparatus has not been previously connected to the image forming apparatus.

14. The memory chip of claim 11, wherein the memory is configured to receive updated complete information from the printer processor in response to the refill apparatus being connected to the printer and a successful completion of the refill to a cartridge of the printer.

15. The memory chip of claim 11, wherein the memory is configured to transmit a serial information stored on the memory to the printer processor in response to the refill apparatus being connected to the printer and the start information indicating that the refill apparatus has been previously connected to the printer.

16. The memory chip of claim 15, wherein the memory is configured to transmit a refill time information of a cartridge of the printer to the printer processor in response to the refill apparatus being connected to the printer and the serial information stored on the memory matching a serial information stored on the cartridge.

17. The memory chip of claim 11, wherein the memory is further configured to store thereon at least one of a serial information of the refill apparatus, a serial information of a cartridge of the printer, or a refill time information comprising date and time information of a previous refill.

18. The memory chip of claim 11, wherein the memory is further configured to store thereon refill time information comprising a date and time information of a previous refill.

* * * * *